US012669246B2

United States Patent

(12) United States Patent
Dzieciol et al.

(10) Patent No.: US 12,669,246 B2
(45) Date of Patent: Jun. 30, 2026

(54) CROSS FIRE TUBE INSTALLATION/REMOVAL METHODS AND APPARATUS

(71) Applicant: General Electric Company, Schenectady, NY (US)

(72) Inventors: Piotr Dzieciol, Warsaw (PL); Mateusz Dolecki, Warsaw (PL); Piotr Wojciechowski, Warsaw (PL); Szymon Perkowski, Warsaw (PL); Marek Szyszkowski, Warsaw (PL)

(73) Assignee: GE VERNOVA INFRASTRUCTURE TECHNOLOGY LLC, Greenville, SC (US)

( * ) Notice: Subject to any disclaimer, the term of this patent is extended or adjusted under 35 U.S.C. 154(b) by 905 days.

(21) Appl. No.: 16/890,142

(22) Filed: Jun. 2, 2020

(65) Prior Publication Data

US 2020/0393132 A1 Dec. 17, 2020

(30) Foreign Application Priority Data

Jun. 13, 2019 (PL) ........................................ 430232

(51) Int. Cl.
*F23R 3/48* (2006.01)

(52) U.S. Cl.
CPC ............ *F23R 3/48* (2013.01); *F05D 2230/60* (2013.01); *F05D 2240/35* (2013.01)

(58) Field of Classification Search
CPC .............. F23R 3/48; F23R 2900/00017; F23R 2900/00019; F23R 3/60; F05D 2230/60; F05D 2240/35; B25B 27/06; B25B 27/062
See application file for complete search history.

(56) References Cited

U.S. PATENT DOCUMENTS

| | | | | | |
|---|---|---|---|---|---|
| 2,424,681 | A * | 7/1947 | Eberhart | B25B 27/023 29/263 |
| 2,646,619 | A * | 7/1953 | Mccord | B25B 27/062 29/263 |
| 3,341,175 | A | 9/1967 | Branick | |
| 4,716,642 | A | 1/1988 | Bill, Sr. et al. | |
| 4,724,608 | A * | 2/1988 | Parrott | B25B 27/023 29/259 |

(Continued)

FOREIGN PATENT DOCUMENTS

| | | | |
|---|---|---|---|
| EP | 3306198 | A1 | 4/2018 |
| JP | 2018-087569 | A | 6/2018 |
| WO | 2015013246 | A1 | 1/2015 |

OTHER PUBLICATIONS

Extended EP Search Report, EP 20178626.6, dated Oct. 14, 2020 (8 pp.).
Office Action for JP 2020-095188, dated Jan. 17, 2024 (10 pp.).

*Primary Examiner* — Thomas P Burke
(74) *Attorney, Agent, or Firm* — Eversheds Sutherland (US) LLP

(57) ABSTRACT

The present application provides a cross fire tube installation/removal apparatus (100) for use with a combustor (25) of a gas turbine engine (10). The cross fire tube installation/removal apparatus (100) includes a cross fire tube assembly (110) having a sleeve (120, 130) with a tube groove (170, 180) therein and a cross fire tube tool (300) having a spring (390) with a spring flange (440). The spring flange (340) is sized to engage the tube groove (170, 180).

13 Claims, 10 Drawing Sheets

(56) References Cited

U.S. PATENT DOCUMENTS

| | | | | |
|---|---|---|---|---|
| 5,255,435 | A * | 10/1993 | Shultz | B25B 27/023<br>29/259 |
| 5,623,761 | A * | 4/1997 | Chiang | B25B 27/062<br>29/260 |
| 9,174,331 | B1 * | 11/2015 | Coghlan | B25B 27/062 |
| 10,265,839 | B1 * | 4/2019 | Hunter | B25B 27/026 |
| 2011/0247193 | A1 * | 10/2011 | Herbold | F23R 3/002<br>29/256 |
| 2014/0137536 | A1 | 5/2014 | Cloninger et al. | |
| 2018/0023813 | A1 * | 1/2018 | Barton | F23R 3/48<br>60/800 |
| 2018/0100654 | A1 * | 4/2018 | Gattermeyer | F23R 3/60 |

* cited by examiner

CROSS FIRE TUBE INSTALLATION/REMOVAL METHODS AND APPARATUS

CROSS-REFERENCE TO RELATED APPLICATIONS

This specification is based upon and claims the benefit of priority from Polish patent application number PL P.430232 filed on Jun. 13, 2019, the entire contents of which are incorporated herein by reference.

TECHNICAL FIELD

The present application and the resultant patent relate generally to gas turbine engines and more particularly relate to improved methods and apparatus for the installation and removal of gas turbine combustor cross fire tubes in a fast, safe, and efficient manner.

BACKGROUND OF THE INVENTION

Adjacent combustors of a gas turbine engine are typically connected by a cross fire tube. Specifically, a cross fire tube may extend through the liners, the flow sleeves, and the casings of adjacent combustors to allow the combustion in one combustor to propagate to the adjacent combustor and to ensure substantially simultaneous ignition and equalized pressure in all combustor chambers of the gas turbine engine. Generally described, the cross fire tubes need to be removed prior to combustor removal and the like. The assembly and/or the location of the cross fire tubes, however, may have one or more disadvantages. For example, current installation and removal methods may be complicated and may result in damage to the cross fire tubes and related components.

SUMMARY OF THE INVENTION

The present application and the resultant patent thus provide a cross fire tube installation/removal apparatus for use with a combustor of a gas turbine engine. The cross fire tube installation/removal apparatus includes a cross fire tube assembly having a sleeve with a tube groove therein and a cross fire tube tool having a spring with a spring flange. The spring flange is sized to engage the tube groove.

The present application and the resultant patent further provide a method of installing a cross fire tube assembly between a first combustor can and a second combustor can. The method includes the steps of inserting a cross fire tube tool through a first passage in the first combustor can, engaging a groove in the cross fire tube assembly with a spring flange of the cross fire tube tool, compressing the cross fire tube tool with the cross fire tube assembly engaged, positioning the cross fire tube assembly in a second passage in the second combustor can, and releasing the cross fire tube tool.

The present application and the resultant patent further provide a cross fire tube installation/removal apparatus for use with a combustor of a gas turbine engine. The cross fire tube installation/removal apparatus includes a cross fire tube assembly having a pair of sleeves with a bias and with each sleeve having a tube groove therein and a cross fire tube tool having a tubular spring with a spring flange. The spring flange is sized to engage the tube groove.

These and other features and improvements of the present application and the resultant patent will become apparent to one of ordinary skill in the art upon review of the following detailed description when taken in conjunction with the several drawings and the appended claims.

DETAILED DESCRIPTION

Figure 1:
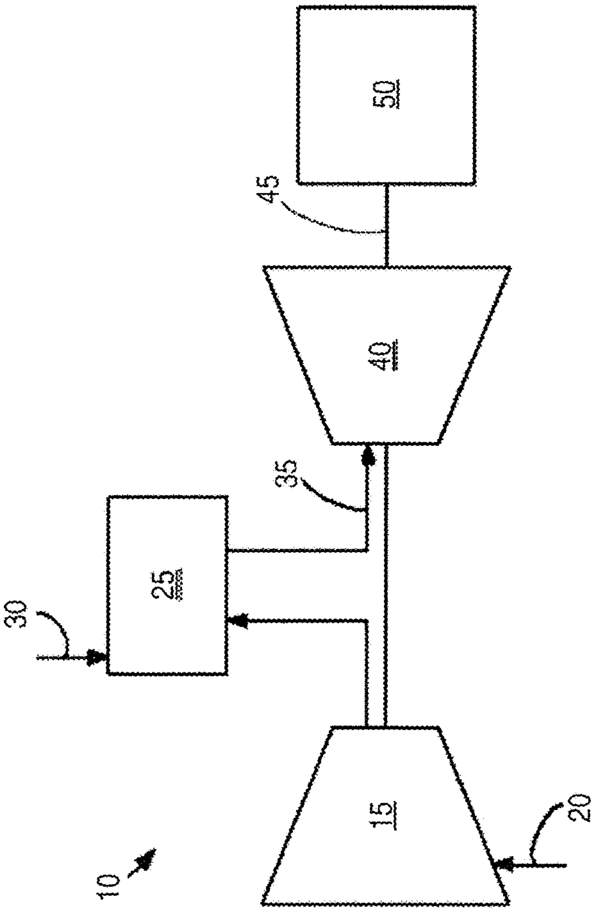
FIG. 1 is a schematic diagram of a gas turbine engine showing a compressor, a combustor, a turbine, and a load.

Referring now to the drawings, in which like numerals refer to like elements throughout the several views, FIG. 1 shows a schematic diagram of gas turbine engine 10 as may be used herein. The gas turbine engine 10 may include a compressor 15. The compressor 15 compresses an incoming flow of air 20. The compressor 15 delivers the compressed flow of air 20 to a number of combustor cans 25. The combustor cans 25 mix the compressed flow of air 20 with a pressurized flow of fuel 30 and ignite the mixture to create a flow of hot combustion gases 35. Although only a single combustor can 25 is shown, the gas turbine engine 10 may include any number of combustor cans 25 positioned in a circumferential array and the like. The flow of the hot combustion gases 35 is in turn delivered to a turbine 40. The flow of the hot combustion gases 35 drives the turbine 40 so as to produce mechanical work. The mechanical work produced in the turbine 40 drives the compressor 15 via a shaft 45 and an external load 50 such as an electrical generator and the like.

The gas turbine engine 10 may use natural gas, various types of syngas, liquid fuels, and/or other types of fuels and blends thereof. The gas turbine engine 10 may be any one of a number of different gas turbine engines offered by General Electric Company of Schenectady, New York, including, but not limited to, those such as a 7 or a 9 series heavy duty gas turbine engine and the like. The gas turbine engine 10 may have different configurations and may use other types of components. Other types of gas turbine engines also may be used herein. Multiple gas turbine engines, other types of turbines, and other types of power generation equipment also may be used herein together.

Figure 2:
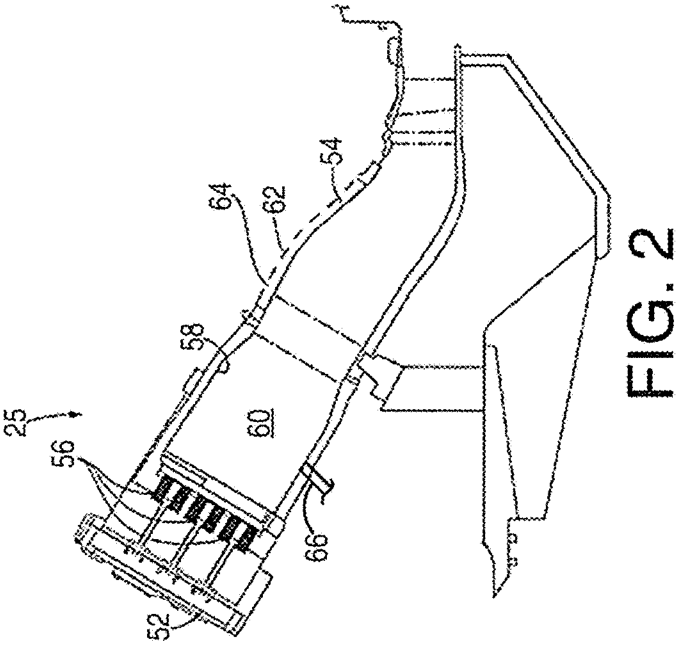
FIG. 2 is a schematic diagram of an example combustor.

FIG. 2 shows a schematic diagram of an example of a combustor can 25 as may be used with the gas turbine engine 10 described above and elsewhere. The combustor can 25 may extend from an end cap 52 at a head end to a transition piece 54 at an aft end about the turbine 40. A number of fuel nozzles 56 may be positioned about the end cap 52. A liner 58 may extend from the fuel nozzles 56 towards the transition piece 54 and may define a combustion zone 60 therein. The liner 58 may be surrounded by a flow sleeve 62. The liner 58 and the flow sleeve 62 may define a flow path 64 therebetween for the flow of air 20 from the compressor 15 or otherwise. The combustor can 25 also may include a cross fire tube assembly 66. As described above, the cross fire tube assembly may extend between adjacent combustor cans 25. The combustor can 25 described herein is for the purpose of example only. Combustor cans 25 with other components and other configurations may be used herein.

Figure 3:
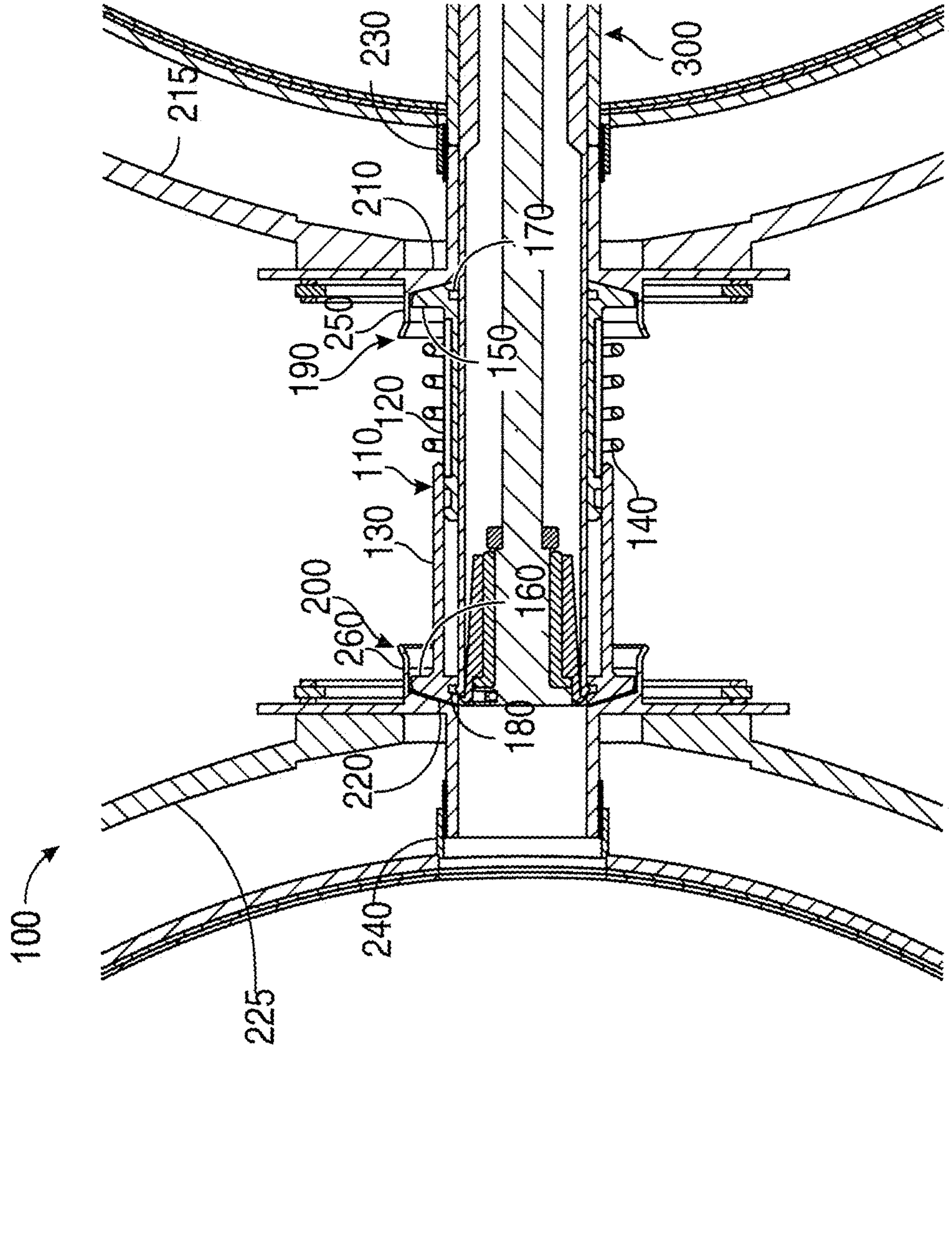
FIG. 3 is a side sectional view of an exemplary cross fire tube installation/removal apparatus as may be described herein with a cross fire tube assembly positioned between adjacent combustor cans.
Figure 4:
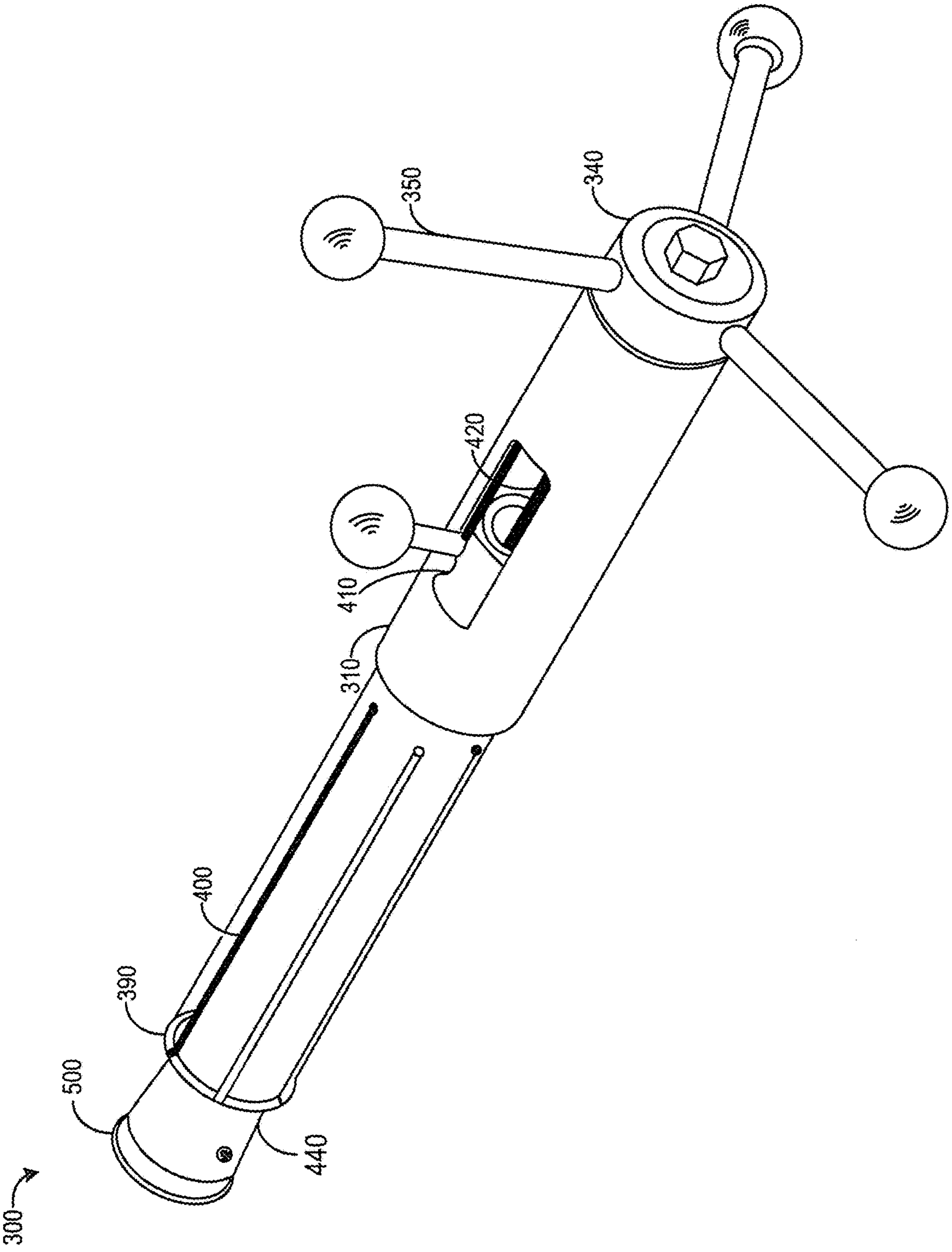
FIG. 4 is a perspective of the cross fire tube installation/removal apparatus of FIG. 3.
Figure 5:
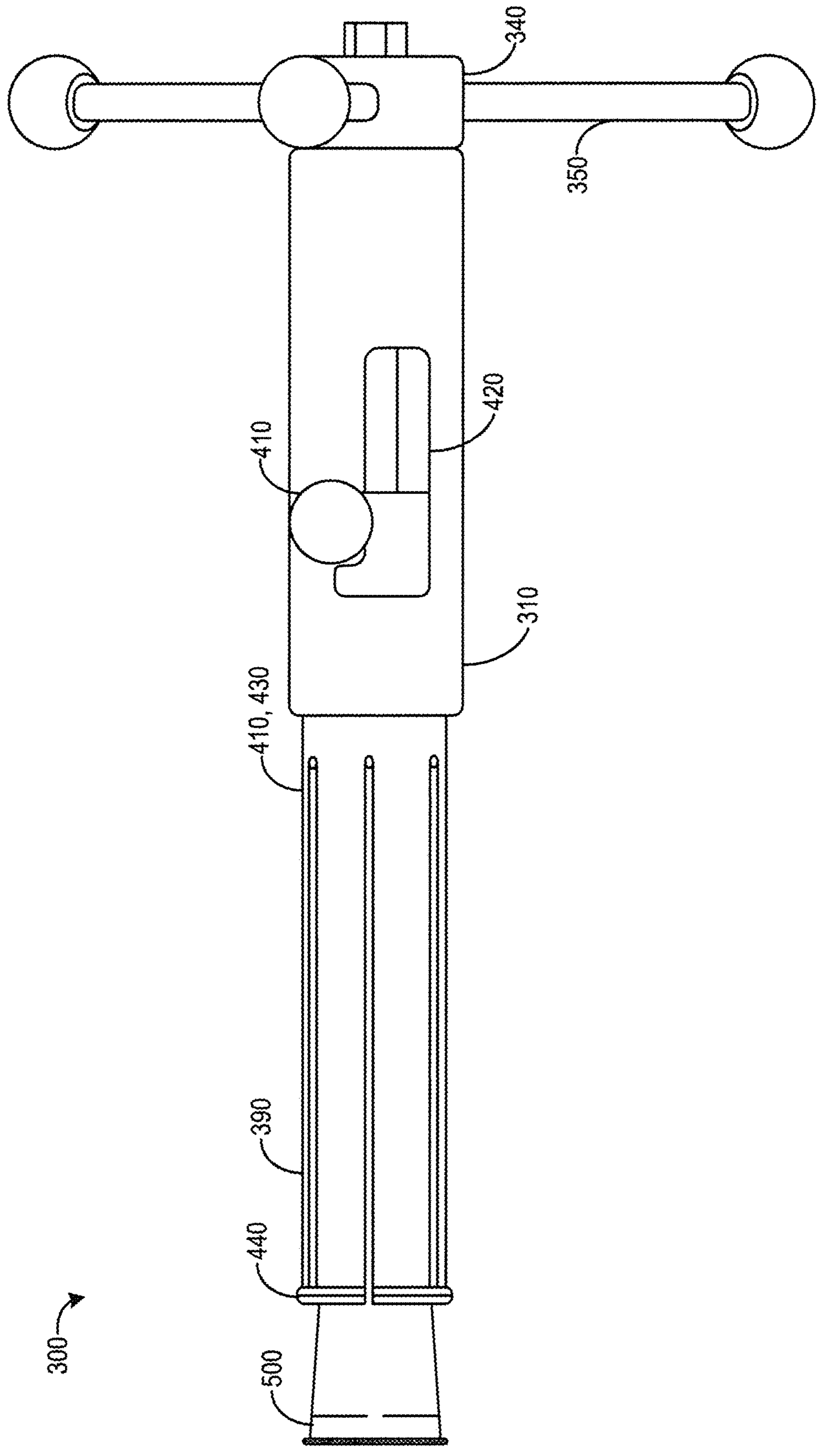
FIG. 5 is a side view of the cross fire tube installation/removal apparatus of FIG. 3.
Figure 6:
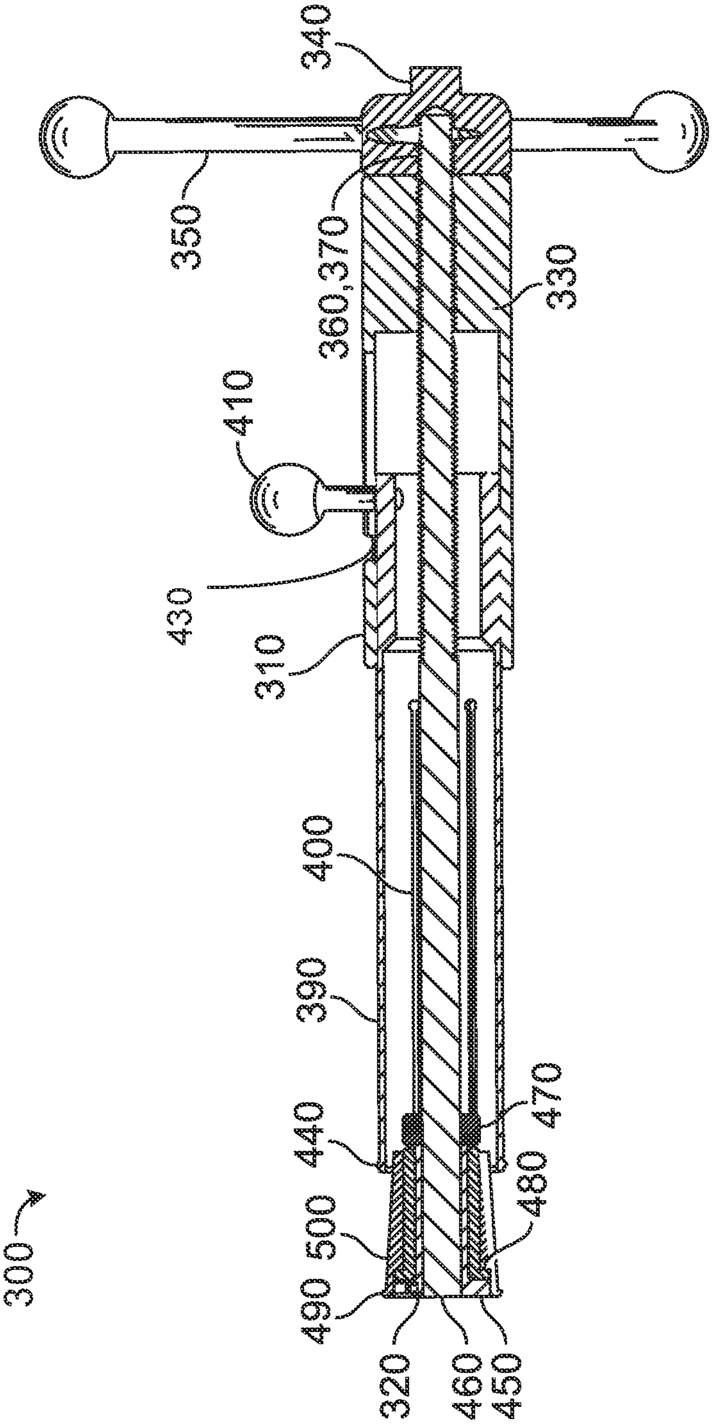
FIG. 6 is a cross-sectional view of the cross fire tube installation/removal apparatus of FIG. 3 taken along line 6-6 of FIG. 5.
Figure 7:
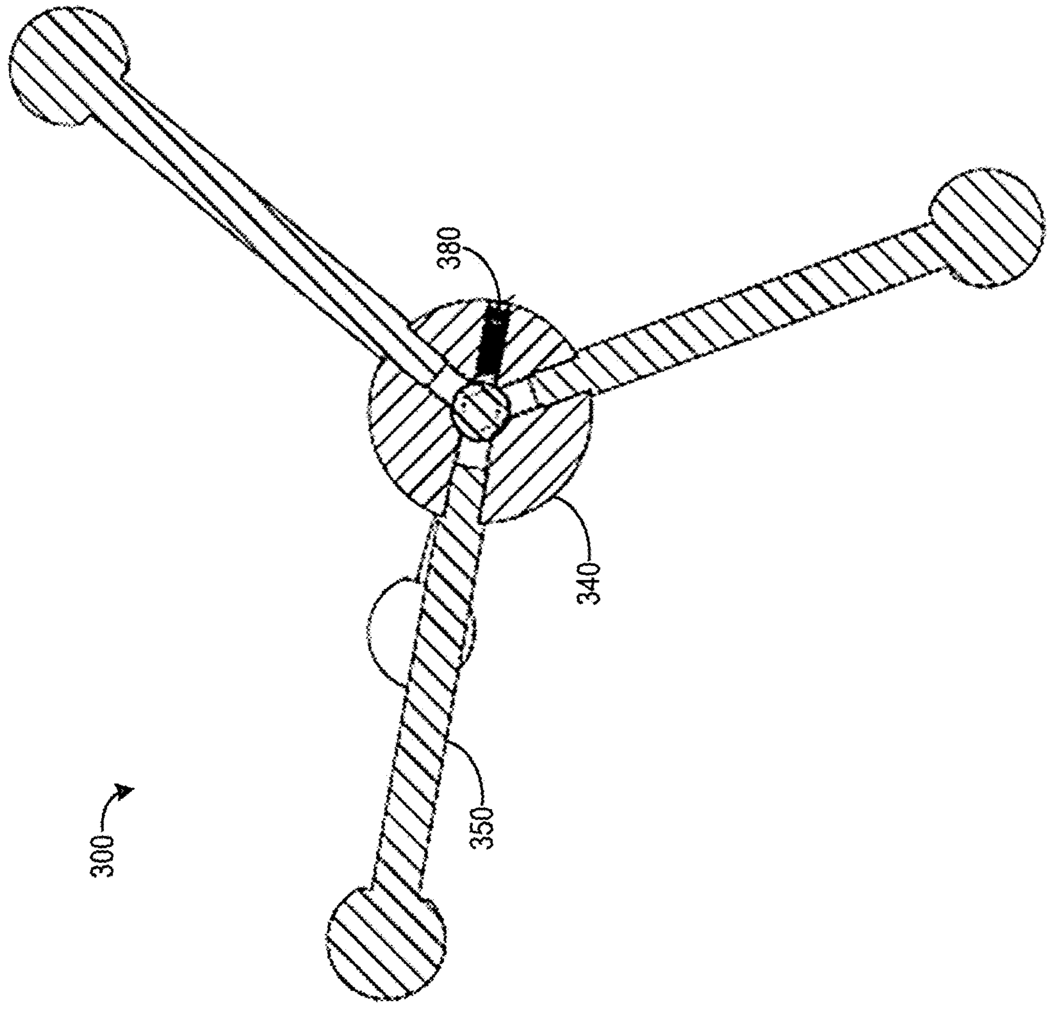
FIG. 7 is a cross-sectional view of the cross fire tube installation/removal apparatus of FIG. 3 taken along line 7-7 of FIG. 5.

FIG. 3 shows a cross fire tube installation/removal apparatus 100 with an example of a cross fire tube assembly 110 as may be described herein. As described above, each cross fire tube assembly 110 extends between two adjacent combustor cans 25. Any number of cross fire tube assemblies 110 may be used herein.

Generally described, the cross fire tube assembly 110 may have a pair of telescoping sleeves, a first sleeve 120 and a second sleeve 130. The first sleeve 120 and the second sleeve 130 may be sized for sliding engagement with one another. One or more springs 140 or other type of biasing elements may be in communication with the first sleeve 120 and the second sleeve 130. The spring 140 may be a compression spring and the like that circumferentially surrounds at least a portion of the first sleeve 120 and the second sleeve 130. The first sleeve 120 may have a first flange 150 at one end thereof and the second sleeve 130 may have a second flange 160 at the opposite end thereof. The first flange 150 may have a first groove 170 on an interior surface and the second flange 150 may have a similar second groove 180 thereon.

The cross fire tube assembly 110 further may include a pair of cross fire tube collars, a first cross fire tube collar 190 and a second cross fire tube collar 200. The first cross fire tube collar 190 extends through a first annular passage 210 through the liner 58 and the flow sleeve 62 of a first combustor can 215 and the second cross fire tube collar 200 extends through a second annular passage 220 the liner 58 and the flow sleeve 62 of an adjacent second combustor can 225. The first cross fire tube collar 190 may be sized for a friction fit and the like within a first liner collar 230 and the second cross fire tube collar 200 may be sized for a friction fit within a second liner collar 240. The first cross fire tube collar 190 may have a first collar flange 250 and the second cross fire tube collar 200 may have a second collar flange 260. The collar flanges 250, 260 may be sized to accommodate the sleeve flanges 150, 160. The size, shape, and configuration of the overall cross fire tube assembly 110 may vary. Other components and other configurations may be used herein.

FIGS. 3-7 show an example of a cross fire tube tool 300 of the cross fire tube installation/removal apparatus 100. The cross fire tube tool 300 includes a reaction arm 310. The reaction arm 310 may be substantially tubular in shape and may be made out of steel or other types of substantially rigid materials. The reaction arm 310 may have a driving screw 320 extending therethrough. The driving screw 320 may be made out of steel or other types of substantially rigid materials. The driving screw 320 may have a number of driving screw threads 330 thereon. The driving screw 320 may have any suitable size, shape, or configuration.

The cross fire tube tool 300 also includes a holder 340 with a number of holder arms 350 positioned at one end of the reaction arm 310. The holder 340 may be made out of stainless steel or other types of substantially rigid materials. The holder 340 may have an internal driving screw aperture 360 therein. The driving screw aperture 360 may have a number of holder threads 370. The driving screw aperture 360 may be sized to accommodate the driving screw 320 therein in threaded engagement for movement therewith. A holder set screw 380 also may be used. The holder arms 350 may be sized and positioned to maneuver the driving screw 320 of the cross fire tube tool 300 as desired.

The cross fire tube tool 300 may have a tubular spring 390 positioned partially within and at the other end of the reaction arm 310. The tubular spring 390 may be substantially tubular in shape and may be made out of steel or other types of substantially rigid materials. The tubular spring 390 may have a number of spring slots 400 formed therein so as to give the tubular spring 390 an appropriate amount of compressibility. The size, shape, and configuration of the spring slots 400 may vary. The tubular spring 390 may be maneuverable within the reaction arm 310 via a locking knob 410 positioned within a locking knob aperture 420 in the reaction arm 310. The locking knob 410 may be made out of stainless steel or other types of substantially rigid materials. The locking knob aperture 420 may have a number of locking slots 430 formed therein so as to lock the locking knob 410 and the tubular spring 390 in place for insertion or removal of the cross fire tube assembly 110. The tubular spring 390 may have a spring flange 440 on the opposite end thereof. The spring flange 440 may be sized to engage with the grooves 170, 180 of the cross fire tube assembly 110 as described above.

The cross fire tube tool 300 may have a bearing journal 450 attached one the end of the driving screw 310. The bearing journal 450 may have a number of bearing journal threads 460 thereon for threaded engagement with the driving screw 310. A bearing journal set screw 470 also may be used. The bearing journal 450 may be made out of steel or other types of substantially rigid materials. A sleeve bearing 480 may surround the bearing journal 450. The sleeve bearing 480 may be made out of brass or other types of substantially rigid materials. The bearing journal 450 and the sleeve bearing 480 may be held in place on the driving screw 320 via a hex nut 490 or a similar types of closures. A cone end 500 and the like may enclose the bearing journal 450 and the sleeve bearing 480. The cone end 500 may be made of steel and similar types of substantially rigid materials. Other components and other configurations may be used herein.

Figure 8:
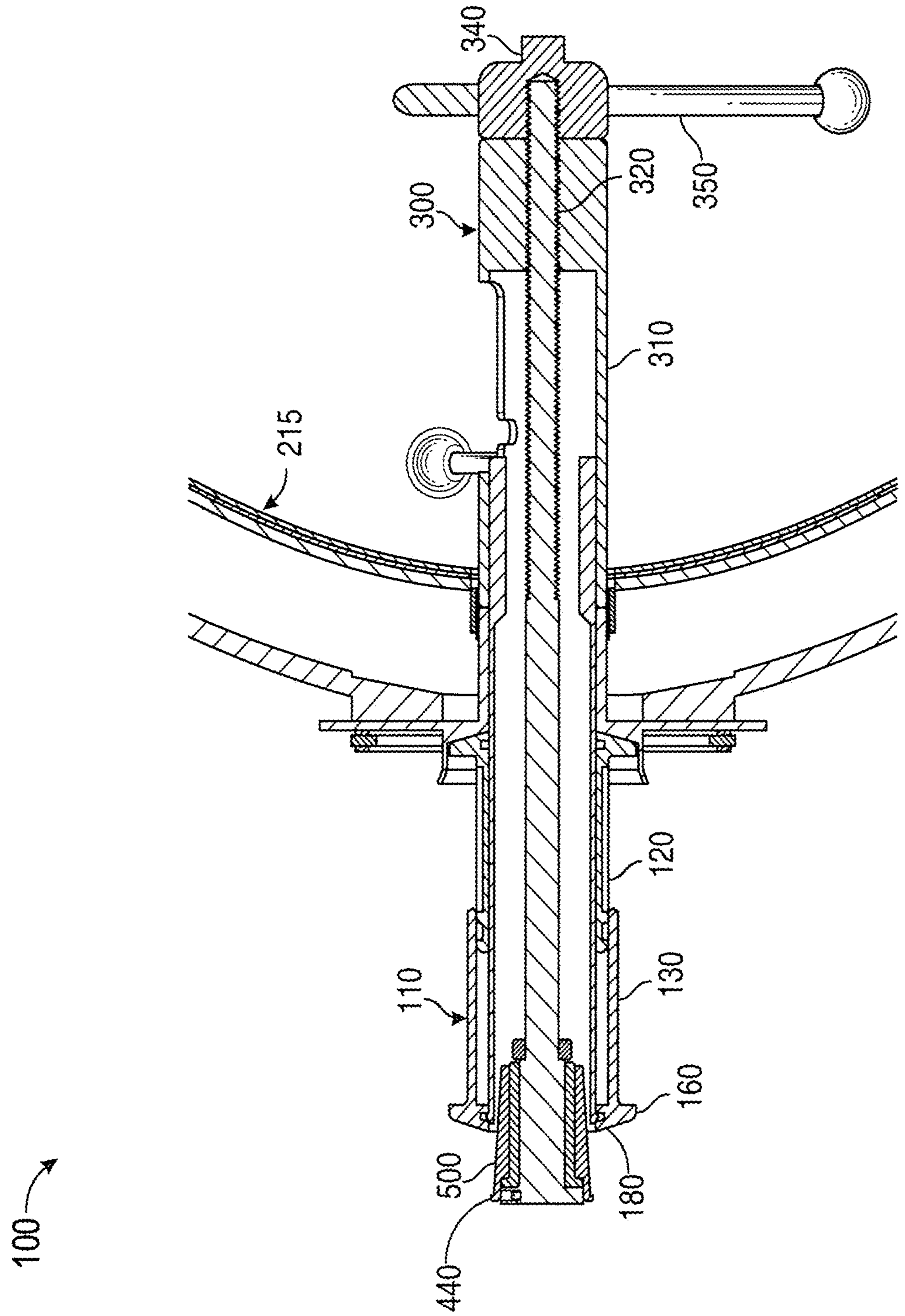
FIG. 8 is a side view of the cross fire tube installation/removal apparatus in use with a cross fire tube assembly positioned between adjacent combustor cans.
Figure 9:
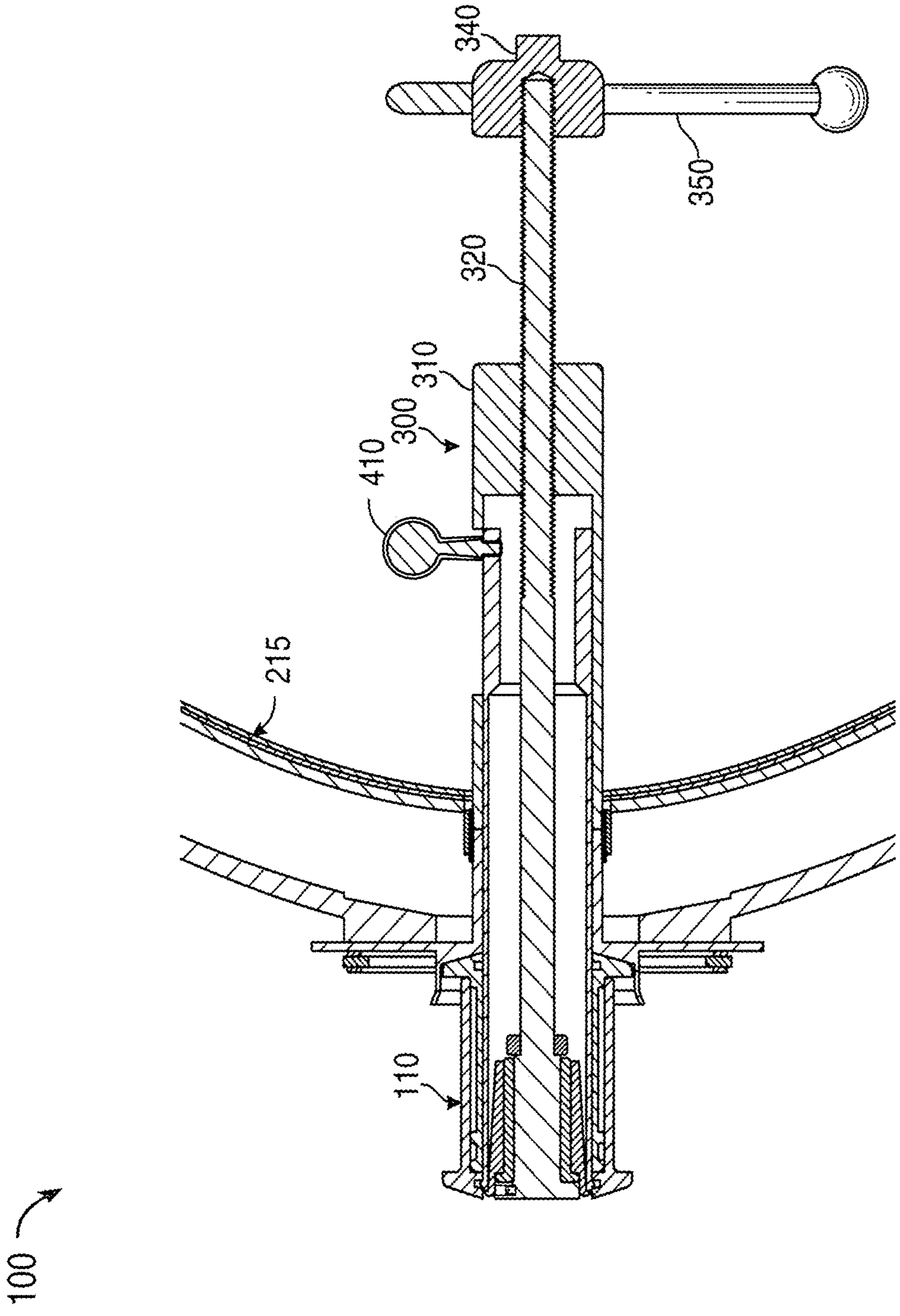
FIG. 9 is a side view of the cross fire tube installation/removal apparatus in further use with a cross fire tube assembly positioned between adjacent combustor cans.
Figure 10:
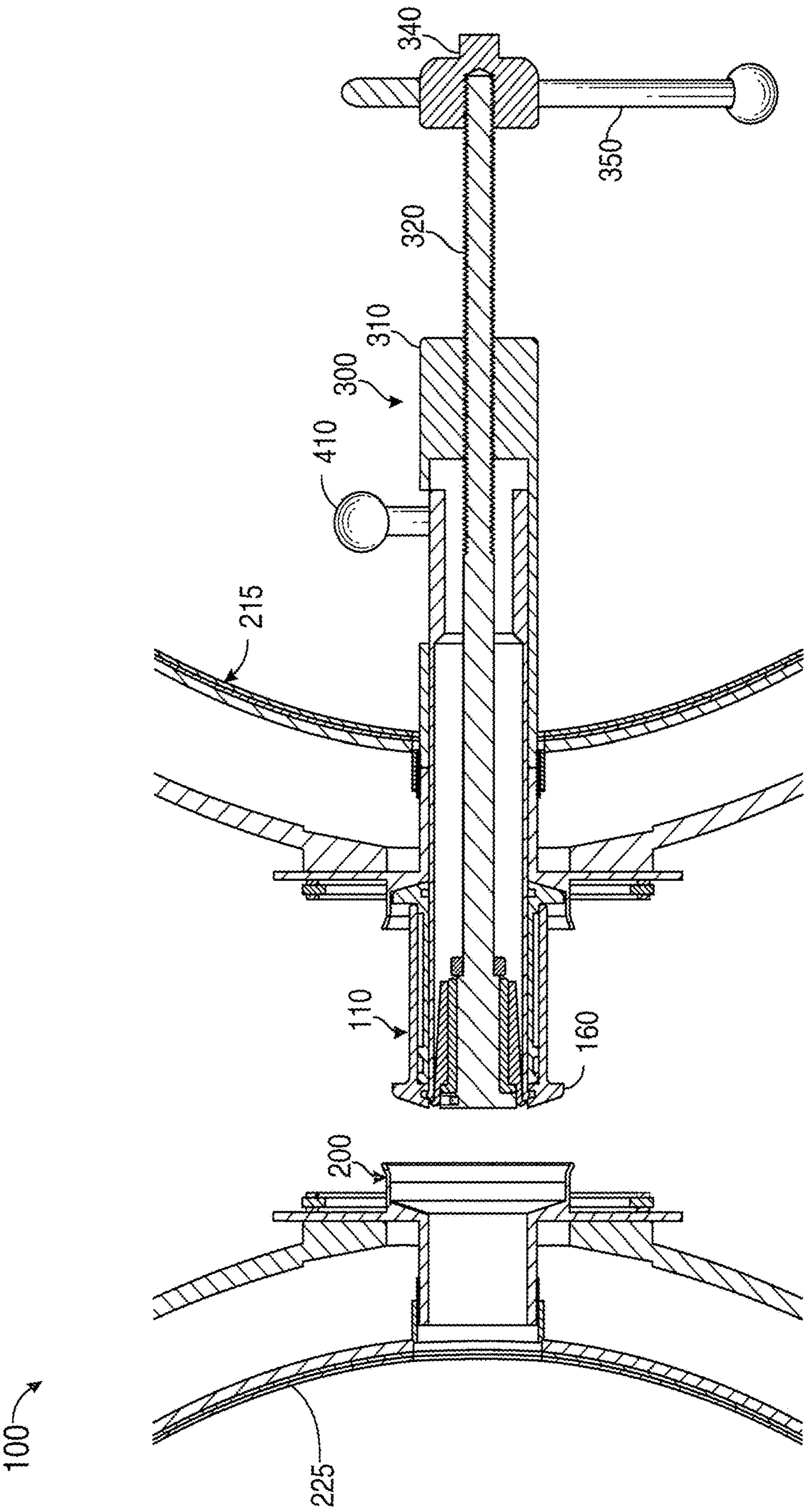
FIG. 10 is a side view of the cross fire tube installation/removal apparatus in further use with a cross fire tube assembly positioned between adjacent combustor cans.
Figure 11:
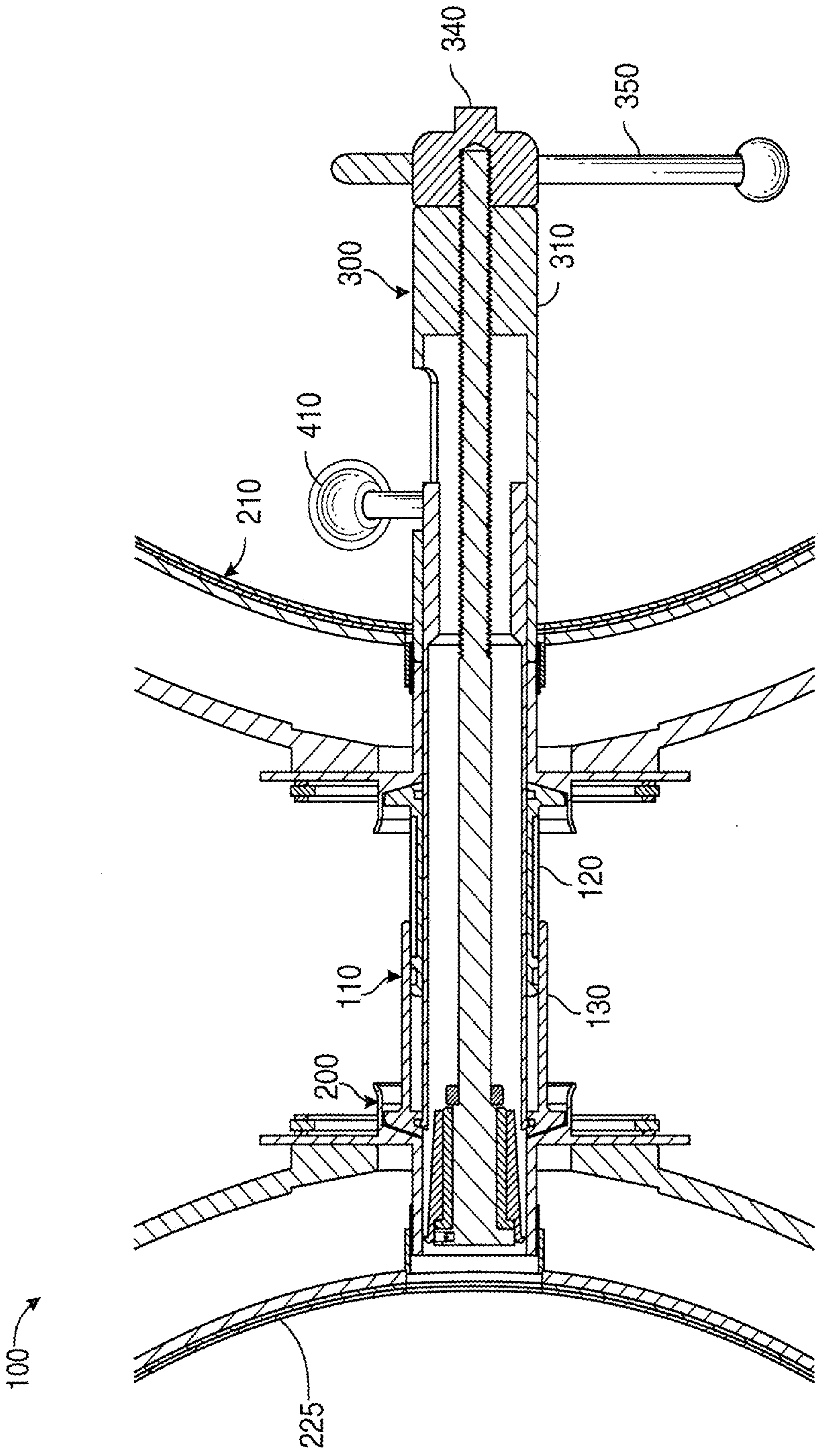
FIG. 11 is a side view of the cross fire tube installation/removal apparatus in further use with a cross fire tube assembly positioned between adjacent combustor cans.

FIGS. 8-11 show the cross fire tube apparatus 100 in operation. In FIG. 8, the cross fire tube tool 300 may be inserted through the first annular passage 210 within the liner 58 and the flow sleeve 62 of the first combustion can 215. The cross flow tube assembly 110 then may be placed on the cross fire tube tool 300 between the two adjacent combustor cans 215, 225. In FIG. 9, the cross fire tube tool 300 may be compressed such that the spring flange 440 of the tubular spring 390 engages the second groove 180 in the second flange 160 of the second sleeve 130 of the cross fire tube assembly 110. The cone end 500 may be configured to expand the diameter of the tubular spring 390 to lock the spring flange 440 in place. In FIG. 10, the cross fire tube tool 300 may be further compressed via the driving screw 320 and the holder 340 so as to compress the cross fire tube assembly 110. In FIG. 11, the second collar 200 of the cross fire tube assembly 110 may be positioned within the second passage 220 of the second combustor can 225. The compression on the cross fire tool 300 then may be released so as to drive the second sleeve 130 of the cross fire tube assembly 110 into the second collar 200. The cross fire tube tool 300 then may be removed. Similarly, the cross fire tube assembly 110 may be removed in largely the opposite fashion. Other components and other configurations may be used herein.

The cross fire tube tool 300 thus may lock into place within the grooves 170, 180 of the cross fire tube assembly 110 for accurate placement given the use of the spring flange 440 and the cone end 500. Likewise, the tubular spring 390 may be mechanically compressed via the driving screw 320. The cross fire installation/removal apparatus 100 thus allows for the accurate and timely installation and removal of the cross fire tube assemblies 110.

It should be apparent that the foregoing relates only to certain embodiments of the present application and the resultant patent. Numerous changes and modifications may be made herein by one of ordinary skill in the art without departing from the general spirit and scope of the invention as defined by the following claims and the equivalents thereof.

We claim:

1. A cross fire tube installation/removal apparatus for use with a combustor of a gas turbine engine, comprising:
- a cross fire tube assembly;
- the cross fire tube assembly comprising a sleeve with a tube groove therein; and
- a cross fire tube tool;
- the cross fire tube tool comprising a spring with a spring flange;
- wherein the spring flange is sized to engage the tube groove; and
- a reaction arm positioned on one end of the spring;
- wherein the spring is retractable within the reaction arm such that the spring flange engages the tube groove.

2. The cross fire tube installation/removal apparatus of claim 1, wherein the spring comprises a tubular spring.

3. The cross fire tube installation/removal apparatus of claim 2, wherein the tubular spring comprises a plurality of spring slots therein.

4. The cross fire tube installation/removal apparatus of claim 1, wherein the spring is retractable within the reaction arm via a locking knob.

5. The cross fire tube installation/removal apparatus of claim 1, wherein the cross fire tube tool comprises a driving screw positioned within the reaction arm and the spring.

6. The cross fire tube installation/removal apparatus of claim 5, wherein the cross fire tube tool comprises a holder attached to the driving screw.

7. The cross fire tube installation/removal apparatus of claim 6, wherein the holder comprises a plurality of holder arms.

8. A cross fire tube installation/removal apparatus comprising:
- a cross fire tube assembly;
- the cross fire tube assembly comprising a sleeve with a tube groove therein; and
- a cross fire tube tool;
- the cross fire tube tool comprising a spring with a spring flange;
- wherein the spring flange is sized to engage the tube groove;
- a reaction arm positioned on one end of the spring; and
- a driving screw positioned within the reaction arm and the spring;
- wherein the driving screw comprises a cone end for engagement with the spring flange; and
- wherein the spring is retractable within the reaction arm such that the spring flange engages the tube groove and is locked into place by the cone end.

9. The cross fire tube installation/removal apparatus of claim 8, wherein the driving screw comprises a bearing journal positioned thereon about the cone end.

10. The cross fire tube installation/removal apparatus of claim 9, wherein the driving screw comprises a sleeve bearing positioned about the cone end.

11. The cross fire tube installation/removal apparatus of claim 1, wherein the cross fire tube assembly comprises a pair of sleeves and a bias.

12. The cross fire tube installation/removal apparatus of claim 1, wherein the sleeve comprises a flange with the tube groove therein.

13. The cross fire tube installation/removal apparatus of claim 12, wherein the cross fire tube assembly comprises a collar sized to accommodate the flange.

* * * * *